(12) United States Patent
Tamaki et al.

(10) Patent No.: US 9,466,987 B2
(45) Date of Patent: Oct. 11, 2016

(54) POWER TRANSMISSION DEVICE AND WIRELESS POWER TRANSMISSION SYSTEM USING THE POWER TRANSMISSION DEVICE

(71) Applicant: TDK CORPORATION, Tokyo (JP)

(72) Inventors: Kazutaka Tamaki, Tokyo (JP); Hitoyoshi Kurata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 516 days.

(21) Appl. No.: 14/105,678

(22) Filed: Dec. 13, 2013

(65) Prior Publication Data

US 2014/0167523 A1 Jun. 19, 2014

(30) Foreign Application Priority Data

Dec. 19, 2012 (JP) ................................. 2012-276893
Nov. 13, 2013 (JP) ................................. 2013-235175

(51) Int. Cl.
*H01F 38/14* (2006.01)
*H02J 5/00* (2016.01)
*H02J 7/02* (2016.01)

(52) U.S. Cl.
CPC ............... *H02J 5/005* (2013.01); *H02J 7/025* (2013.01)

(58) Field of Classification Search
None
See application file for complete search history.

(56) References Cited

U.S. PATENT DOCUMENTS

| 7,208,912 | B2 * | 4/2007 | Ghabra | G01V 3/101 320/108 |
| 8,427,012 | B2 * | 4/2013 | Azancot | H02J 5/005 307/104 |
| 9,257,851 | B2 * | 2/2016 | Baarman | H02J 5/005 |

FOREIGN PATENT DOCUMENTS

JP   A-2010-233442   10/2010

\* cited by examiner

*Primary Examiner* — Jung Kim
*Assistant Examiner* — Aqeel Bukhari
(74) *Attorney, Agent, or Firm* — Oliff PLC (57) ABSTRACT

A power transmission device includes a power conversion circuit that outputs an alternating voltage in order to generate an alternating magnetic field and a control circuit used to control a frequency of the alternating voltage. The control circuit sets, in a predetermined frequency range, the frequency of the alternating voltage to a higher one of a first frequency at which transmission efficiency is highest and a second frequency at which a voltage generated in the power receiving device is highest, and performs power transmission.

6 Claims, 7 Drawing Sheets

POWER TRANSMISSION DEVICE AND WIRELESS POWER TRANSMISSION SYSTEM USING THE POWER TRANSMISSION DEVICE

BACKGROUND OF THE INVENTION

1. Field of the Invention

The present invention relates to a power transmission device and a wireless power transmission system that uses the power transmission device.

2. Description of the Related Art

A non-contact power feeding technology that enables power supply in a non-contact manner from the outside to, for example, electric cars or mobile devices without using a power cable has been attracting attention.

In Japanese Unexamined Patent Application Publication No. 2010-233442, a non-contact power feeding device is proposed that includes impedance detection means that detects impedance which is defined as seen from the power feeding side in a predetermined frequency range and frequency change means that sets a frequency of alternating current (AC) power. The frequency change means sets the frequency of AC power in response to a value of the impedance detected by the impedance detection means in the predetermined frequency range. Specifically, in the predetermined frequency range, the frequency change means sets the frequency of AC power to a frequency at which the phase of the impedance is zero or to a frequency at which the absolute value of the impedance is a minimum.

SUMMARY OF THE INVENTION

However, as the technology disclosed in Japanese Unexamined Patent Application Publication No. 2010-233442, with a method in which the frequency change means sets, in the predetermined frequency range, the frequency of AC power to the frequency at which the phase of the impedance is zero, a point at which the phase is zero corresponds to a kind of area of neutrality including an inductive region and a capacitive region. It may be difficult for, for example, a high-frequency switching power source to perform control its switching devices in the area of neutrality so that some circuit parts might be damaged. In addition, with a method in which the frequency change means sets, in the predetermined frequency range, the frequency of AC power to the frequency at which the absolute value of the impedance is a minimum, transmission efficiency is not maximized and it may be impossible to maintain high efficiency.

The present invention has been made in light of the above-described problems. Accordingly, it is an object of the present invention to provide a power transmission device that may maintain high power transmission efficiency and may realize stable power feeding and a wireless power transmission system that uses the power transmission device.

A power transmission device according to an aspect of the present invention is a power transmission device that wirelessly transmits alternating current power to a power receiving device. The power transmission device includes a power conversion circuit that outputs an alternating voltage in order to generate an alternating magnetic field and a control circuit used to control a frequency of the alternating voltage. The control circuit sets, in a predetermined frequency range, the frequency of the alternating voltage to a higher one of a first frequency at which transmission efficiency is highest and a second frequency at which a voltage generated in the power receiving device is highest, and performs power transmission.

According to the aspect of the present invention, the control circuit sets, in the predetermined frequency range, the frequency of the alternating voltage to the higher one of the first frequency at which the transmission efficiency is highest and the second frequency at which the voltage generated in the power receiving device is highest and performs power transmission. Here, when the frequency of the alternating voltage is set to the first frequency at which the transmission efficiency is highest or the second frequency at which the voltage generated in the power receiving device is highest, power transmission efficiency may be improved. When the higher one of these two frequencies is selected and the frequency of the alternating voltage is set to the selected frequency, a change in the voltage generated in the power receiving device may be suppressed with respect to a change in load. Thus, high power transmission efficiency may be maintained and stable power feeding may be realized.

Preferably, a power source circuit that supplies direct current power to the power conversion circuit is included, and the control circuit sets the frequency of the alternating voltage and thereafter causes a supply voltage, which is to be supplied to the power conversion circuit, to be higher than a supply voltage obtained before the frequency of the alternating voltage is set. In this case, high power transmission efficiency may be maintained and stable power feeding may be realized.

Preferably, the power conversion circuit is a switching circuit, and the control circuit sets the frequency of the alternating voltage and thereafter changes a duty ratio of a switching operation of the power conversion circuit, the duty ratio being obtained before the frequency of the alternating voltage is set. In this case, stable power feeding may be maintained and a balance between the input voltage value and the input current value of the power conversion circuit may be adjusted. As a result, a malfunction such as overcurrent or overvoltage to the power conversion circuit may be prevented and the circuit parts may be prevented from being damaged.

A wireless power transmission system according to another aspect of the present invention includes the above-described power transmission device and a power receiving device. According to the other aspect of the present invention, a wireless power transmission system may be obtained that may maintain high power transmission efficiency and realize stable power feeding.

According to aspects of the present invention, a power transmission device that may maintain high power transmission efficiency and realize stable power feeding and a wireless power transmission system using the power transmission device may be obtained.

DESCRIPTION OF THE PREFERRED EMBODIMENTS

In the following, preferred embodiments of the present invention will be described with reference to the attached drawings. Note that the same or similar portions in the drawings are denoted by the same reference numerals.

First Embodiment

Figure 1:
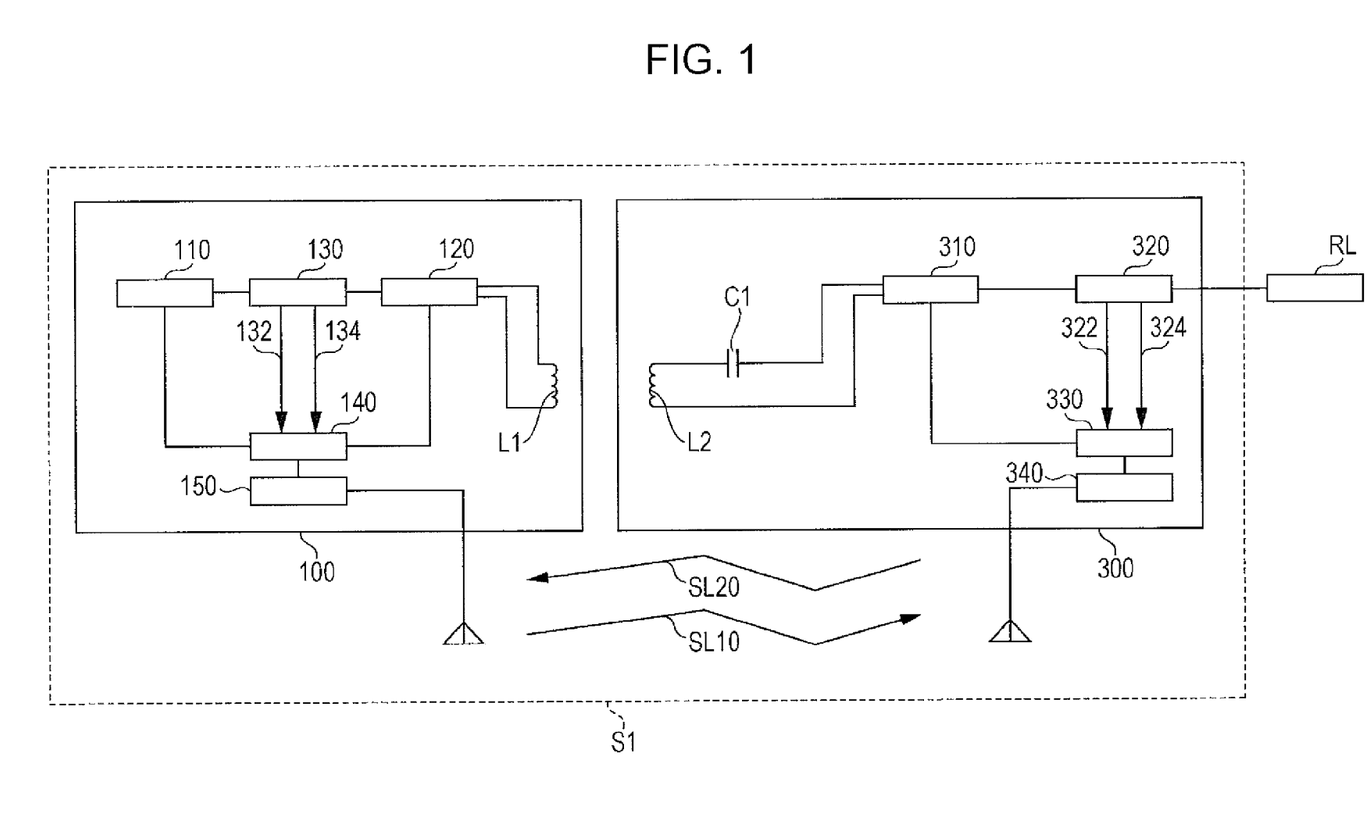
FIG. 1 is a structural diagram illustrating a wireless power transmission system according to a first embodiment of the present invention.

First, the structure of a first embodiment of the present invention will be described. FIG. 1 is a structural diagram illustrating a wireless power transmission system S1 according to the first embodiment of the present invention and a load RL together.

The wireless power transmission system S1 includes, as illustrated in FIG. 1, a power transmission device 100 and a power receiving device 300. Power is transmitted wirelessly from the power transmission device 100 to the power receiving device 300.

The power transmission device 100 includes a power source circuit 110, a power conversion circuit 120, a power-transmission-side detection circuit 130, a control circuit 140, power-transmission-side communication means 150, and a power transmission coil L1. The power receiving device 300 includes a power receiving coil L2, a resonant capacitor C1, a rectifier circuit 310, a power-receiving-side detection circuit 320, an arithmetic circuit 330, and power-receiving-side communication means 340.

The power source circuit 110 supplies direct current power to the power conversion circuit 120. The power source circuit 110 is not particularly limited as long as direct current power may be output. For example, a switching power source device such as a switching converter or a high-voltage storage battery, or the like may be used.

The power conversion circuit 120 converts input direct current power supplied from the power source circuit 110 into AC power. The power conversion circuit 120 includes a switching circuit in which a plurality of switching elements are bridge connected. The power conversion circuit 120 outputs an alternating voltage to the power transmission coil L1 (which will be described later).

The power-transmission-side detection circuit 130 has a function for detecting an input voltage value and an input current value of the power conversion circuit 120. Specifically, the power-transmission-side detection circuit 130 is connected between the power source circuit 110 and the power conversion circuit 120. A voltage divider or the like is used as detection means for detecting an input voltage value, and a current sensor, a current transformer, or the like is used as detection means for detecting an input current value. Here, "the input voltage value and the input current value of the power conversion circuit 120" according to the first embodiment correspond to a voltage value and a current value in the power transmission device 100. The input voltage value and the input current value detected by the power-transmission-side detection circuit 130 are converted into a voltage detection signal 132 and a current detection signal 134. The voltage detection signal 132 and the current detection signal 134 are output to the control circuit 140 (which will be described later).

The control circuit 140 calculates a transmission power value from the input voltage value and the input current value of the power conversion circuit 120 on the basis of the voltage detection signal 132 and the current detection signal 134 output from the power-transmission-side detection circuit 130. In addition, the control circuit 140 controls a driving frequency of the power conversion circuit 120 (the frequency of the alternating voltage output by the power conversion circuit 120) and performs a frequency search operation for selecting a driving frequency of the power conversion circuit 120 in a predetermined frequency range. The predetermined frequency range according to the first embodiment is a region where the driving frequency controlled by the control circuit 140 is in an inductive region, preferably a range of ±10 (kHz) from a frequency at which a voltage generated in the power receiving device 300 (which will be described later) is a maximum, and more preferably a range of ±25 (kHz) from the frequency. Furthermore, the control circuit 140 controls a power feeding operation of the power transmission device 100 by controlling a supply voltage to the power conversion circuit 120.

The power-transmission-side communication means 150 has a function for communicating with the power receiving device 300. Specifically, the power-transmission-side communication means 150 has a function for sending a request signal SL10 for requesting an output voltage value of the rectifier circuit 310 and a receiving power value from the power-receiving-side communication means 340 (which will be described later) of the power receiving device 300 and a function for receiving a power-receiving-side state signal SL20 of an output voltage value of the rectifier circuit 310 and a receiving power value, the power-receiving-side state signal SL20 being transmitted from the power-receiving-side communication means 340.

The power transmission coil L1 is formed by winding litz wire made of copper, aluminum, or the like. The number of windings is set as necessary in accordance with the distance between the power transmission coil L1 and the power receiving coil L2 and a desired power transmission efficiency. An alternating voltage output by the power conversion circuit 120 causes an alternating current to flow in the power transmission coil L1 and consequently an alternating magnetic field is generated. That is, AC power is transmitted by this alternating magnetic field to the power receiving coil L2 (which will be described later). In the case where the wireless power transmission system S1 according to the first embodiment is used in feeding facilities for vehicles such as electric cars, the power transmission coil L1 is provided underground or near the ground.

The power receiving coil L2 is capable of receiving power from the power transmission coil L1, and is formed by winding litz wire made of copper, aluminum, or the like. The number of windings is set as necessary in accordance with the distance between the power transmission coil L1 and the power receiving coil L2 and the desired power transmission efficiency. In the case where the wireless power transmission system S1 according to the first embodiment is used in feeding facilities for vehicles such as electric cars, the power receiving coil L2 is mounted in a bottom portion of a vehicle.

The resonant capacitor C1 and the power receiving coil L2 form an LC resonant circuit. In the first embodiment, the resonant capacitor C1 is connected in series with the power receiving coil L2; however, the way in which the resonant capacitor C1 is connected is not limited to this. For example, the resonant capacitor C1 may be connected in parallel with the power receiving coil L2.

The rectifier circuit 310 converts AC power received by the power receiving coil L2 into direct current power and supplies the direct current power to the load RL. The rectifier circuit 310 includes a bridge type circuit in which a plurality of switching elements are bridge connected, such as a half-wave rectifier circuit or a full-wave rectifier circuit.

The power-receiving-side detection circuit 320 has a function for detecting an output voltage value and an output current value of the rectifier circuit 310. Specifically, the power-receiving-side detection circuit 320 is connected between the rectifier circuit 310 and the load RL. A voltage divider or the like is used as detection means for detecting an output voltage value, and a current sensor, a current transformer, or the like is used as detection means for detecting an output current value. Here, "the output voltage value and the output current value of the rectifier circuit 310" according to the first embodiment correspond to a voltage value and a current value generated in the power receiving device 300. The output voltage value and the output current value detected by the power-receiving-side detection circuit 320 are converted into a voltage detection signal 322 and a current detection signal 324. The voltage detection signal 322 and the current detection signal 324 are output to the arithmetic circuit 330.

The arithmetic circuit 330 calculates a receiving power value from the output voltage value and the output current value of the rectifier circuit 310 on the basis of the voltage detection signal 322 and the current detection signal 324 output from the power-receiving-side detection circuit 320.

The power-receiving-side communication means 340 has a function for communicating with the power transmission device 100. Specifically, the power-receiving-side communication means 340 has a function for requesting calculation of an output voltage value and a receiving power value from the power-receiving-side detection circuit 320 and the arithmetic circuit 330 upon receiving the request signal SL10 from the power-transmission-side communication means 150 and has a function for sending the power-receiving-side state signal SL20 of the output voltage value and the receiving power value to the power-transmission-side communication means 150 of the power transmission device 100. Here, communication between the power-transmission-side communication means 150 and the power-receiving-side communication means 340 is performed using infrared communication, wireless communication, or the like.

Figure 2:
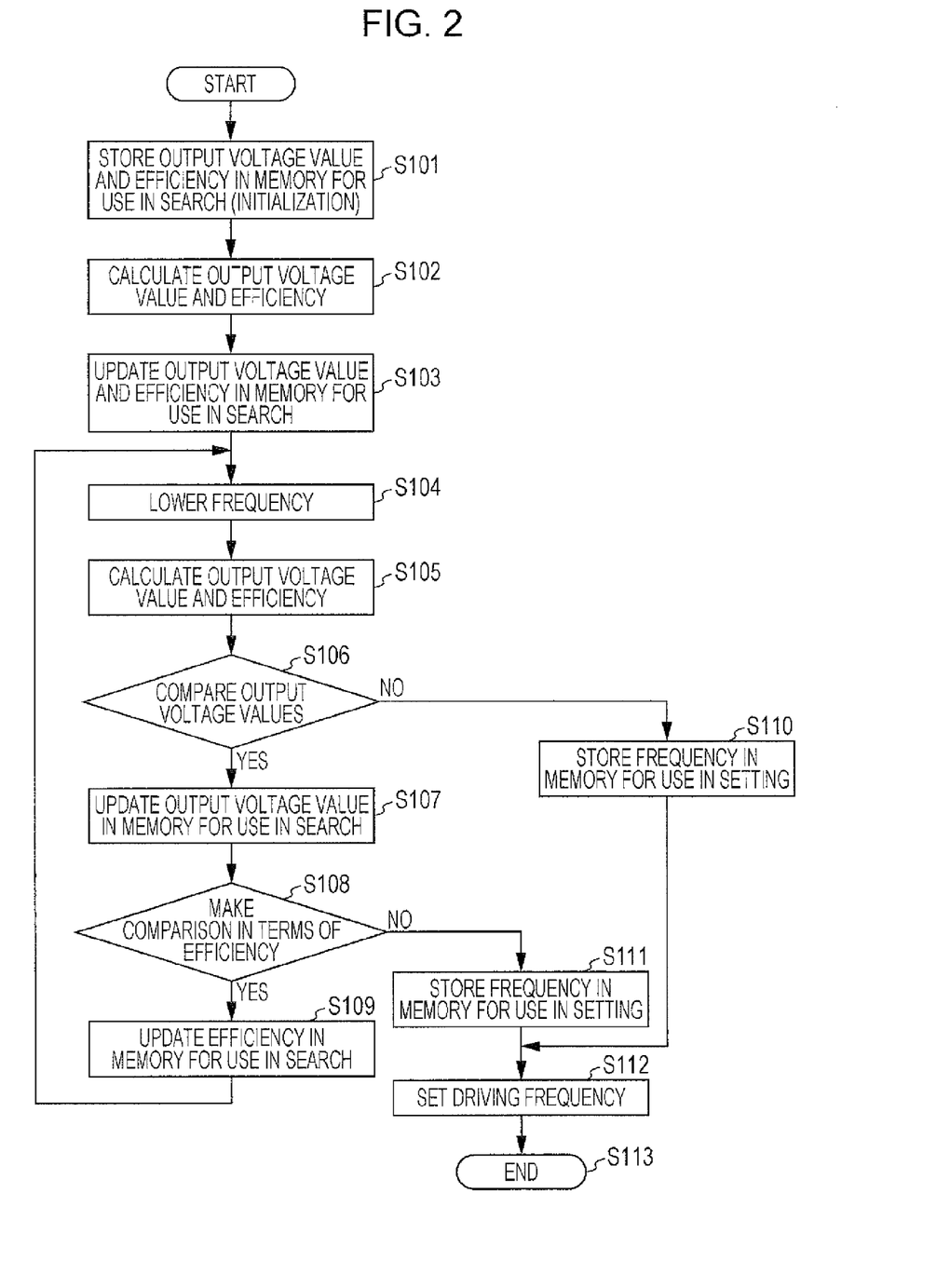
FIG. 2 is a flowchart illustrating a frequency search operation of the wireless power transmission system according to the first embodiment of the present invention.

Next, with reference to a flowchart of FIG. 2, a frequency search operation of the wireless power transmission system S1 according to the first embodiment will be described. FIG. 2 is a flowchart illustrating the frequency search operation of the wireless power transmission system S1 according to the first embodiment of the present invention.

First, the control circuit 140 sets the driving frequency of the power conversion circuit 120 to an upper-limit frequency of a frequency search range (a predetermined frequency range) (setting of an initial frequency) and drives the power conversion circuit 120. The power source circuit 110 applies an initial voltage, which has been set low in advance (for example, about 50 V to 150 V), to the power transmission device 100 and the transmission device 100 is driven. Here, initialization is performed by storing an output voltage value, which is set to 0 V, transmission efficiency, which is set to 0%, and the initial frequency in a memory for use in search, the memory being included in the control circuit 140 (step S101).

Next, the request signal SL10 for requesting an output voltage value of the rectifier circuit 310 and a receiving power value is sent from the power-transmission-side communication means 150 to the power-receiving-side communication means 340. When the power-receiving-side communication means 340 receives the request signal SL10 from the power-transmission-side communication means 150, the power-receiving-side detection circuit 320 detects an output voltage value and an output current value of the rectifier circuit 310 and outputs the voltage detection signal 322 and the current detection signal 324 based on the output voltage value and the output current value to the arithmetic circuit 330. The arithmetic circuit 330 calculates a receiving power value from the output voltage value and the output current value of the rectifier circuit 310 on the basis of the received voltage detection signal 322 and the received current detection signal 324. The detected output voltage value and the calculated receiving power value are converted by the power-receiving-side communication means 340 into the power-receiving-side state signal SL20, and the power-receiving-side state signal SL20 is sent to the power-transmission-side communication means 150. Here, the power-transmission-side detection circuit 130 detects an input voltage value and an input current value of the power conversion circuit 120 and outputs the voltage detection signal 132 and the current detection signal 134 based on the input voltage value and the input current value to the control circuit 140. The control circuit 140 calculates a transmission power value from the input voltage value and the input current value of the power conversion circuit 120 on the basis of the received voltage detection signal 132 and the received current detection signal 134. The control circuit 140 calculates a transmission efficiency by using the calculated transmission power value and the receiving power value obtained on the basis of the power-receiving-side state signal SL20 received by the power-transmission-side communication means 150 (step S102).

Next, the control circuit 140 updates the output voltage value and the transmission efficiency stored in the memory for use in search to the output voltage value and the transmission efficiency calculated in step S102 (step S103).

Next, the control circuit 140 changes the driving frequency of the power conversion circuit 120 to a frequency lower than the current driving frequency (step S104).

Next, the control circuit 140 sets the driving frequency of the power conversion circuit 120 to the frequency to which the driving frequency of the power conversion circuit 120 has been changed in step S104 and drives the power conversion circuit 120. Processing similar to that in step S102 is performed and an output voltage value and a transmission efficiency are calculated (step S105).

Next, the control circuit 140 compares the output voltage value stored in the memory for use in search with the output voltage value calculated in step S105 (step S106).

As a result of comparison between the output voltage value stored in the memory for use in search and the output voltage value calculated in step S105, in the case where the output voltage value calculated in step S105 is larger than the output voltage value stored in the memory for use in search (YES in step S106), the output voltage value and the frequency stored in the memory for use in search included in the control circuit 140 are updated to the output voltage value calculated in step S105 and the frequency at which the output voltage value calculated in step S105 is obtained (step S107).

As a result of comparison between the transmission efficiency stored in the memory for use in search and the transmission efficiency calculated in step S105, in the case where the transmission efficiency calculated in step S105 is higher than the transmission efficiency stored in the memory for use in search (YES in step S108), the transmission efficiency and the frequency stored in the memory for use in search included in the control circuit 140 are updated to the transmission efficiency calculated in step S105 and the frequency at which the transmission efficiency calculated in step S105 is obtained (step S109).

When processing in step S109 is completed, the procedure returns to step S104 and processing from step S104 to step S109 is executed again. Here, processing from step S104 to step S109 is repeatedly executed until the driving frequency of the power conversion circuit 120 reaches the lower limit of the frequency search range in step S104.

Note that, while processing from step S104 to step S109 is being repeatedly executed, as a result of comparison between the output voltage value stored in the memory for use in search and the output voltage value calculated in step S105, when the output voltage value calculated in step S105 is smaller than or equal to the output voltage value stored in the memory for use in search (NO in step S106), the output voltage value stored in the memory for use in search included in the control circuit 140 is the largest output voltage value. The frequency at this time is stored as the driving frequency at which the output voltage value is largest, that is, as the driving frequency at which the voltage generated in the power receiving device 300 is highest, in a memory for use in setting, the memory being included in the control circuit 140 (step S110).

The control circuit 140 sets the driving frequency of the power conversion circuit 120 to the frequency that is stored in the memory for use in setting and at which the output voltage value is largest (step S112). In this manner, when the driving frequency of the power conversion circuit 120 is set to the frequency at which the output voltage value is largest, the frequency search operation ends (step S113).

Alternatively, while processing from step S104 to step S109 is being repeatedly executed, as a result of comparison between the transmission efficiency stored in the memory for use in search and the transmission efficiency calculated in step S105, when the transmission efficiency calculated in step S105 is lower than or equal to the transmission efficiency stored in the memory for use in search (NO in step S108), the transmission efficiency stored in the memory for use in search included in the control circuit 140 is the highest transmission efficiency. The frequency at this time is stored as the driving frequency at which the transmission efficiency is highest, in the memory for use in setting included in the control circuit 140 (step S111).

The control circuit 140 sets the driving frequency of the power conversion circuit 120 to the frequency stored in the memory for use in setting and at which the transmission efficiency is highest (step S112). In this manner, when the driving frequency of the power conversion circuit 120 is set to the frequency at which the transmission efficiency is highest, the frequency search operation ends (step S113).

Here, in the frequency search operation according to the first embodiment, since the control circuit 140 performs control in step S104 such that the frequency is changed from high to low, either one of the frequency stored in step S110, the frequency at which the output voltage value is largest (the frequency at which the voltage generated in the power receiving device 300 is highest), or the frequency stored in step S111, the frequency at which the transmission efficiency is highest, will be the higher one.

The above-described frequency search operation ends and the control circuit 140 sets the driving frequency of the power conversion circuit 120 to the frequency stored in step S110 or the frequency stored in step S111 as the higher one of the frequency at which the output voltage value is largest and the frequency at which the transmission efficiency is highest. Thereafter, the control circuit 140 causes the output voltage of the power source circuit 110 to be higher than the output voltage obtained when the frequency search operation is performed. When the output voltage of the power source circuit 110 is increased to a desired output voltage, high power is output in the wireless power transmission system S1 in a steady state. Thus, high power transmission efficiency may be maintained.

As described above, in the wireless power transmission system S1 according to the first embodiment, the control circuit 140 sets, in the predetermined frequency range, the frequency of the alternating voltage (the driving frequency of the power conversion circuit 120) to the higher one of a first frequency at which the transmission efficiency is highest and a second frequency at which the voltage generated in the power receiving device 300 is highest, and performs power transmission. Here, in the case where the frequency of the alternating voltage output by the power conversion circuit 120 (the driving frequency of the power conversion circuit 120) is set to the first frequency at which the transmission efficiency is highest or the second frequency at which the voltage generated in the power receiving device 300 is highest, power transmission efficiency may be improved. In the case where the higher one of these two frequencies is selected and the frequency of the alternating voltage (the driving frequency of the power conversion circuit 120) is set to the selected frequency, a change in the voltage generated in the power receiving device 300 may be suppressed with respect to a change in load. Thus, high power transmission efficiency may be maintained and stable power feeding may be realized.

The wireless power transmission system S1 according to the first embodiment includes the power source circuit 110, which supplies direct current power to the power conversion circuit 120. In the wireless power transmission system S1, the control circuit 140 sets the frequency of the alternating voltage (the driving frequency of the power conversion circuit 120) and thereafter causes a supply voltage, which is to be supplied to the power conversion circuit 120, to be higher than the supply voltage obtained before the frequency of the alternating voltage (the driving frequency of the power conversion circuit 120) is set. In this case, high power transmission efficiency may be maintained and stable power feeding may be realized.

Figure 3:
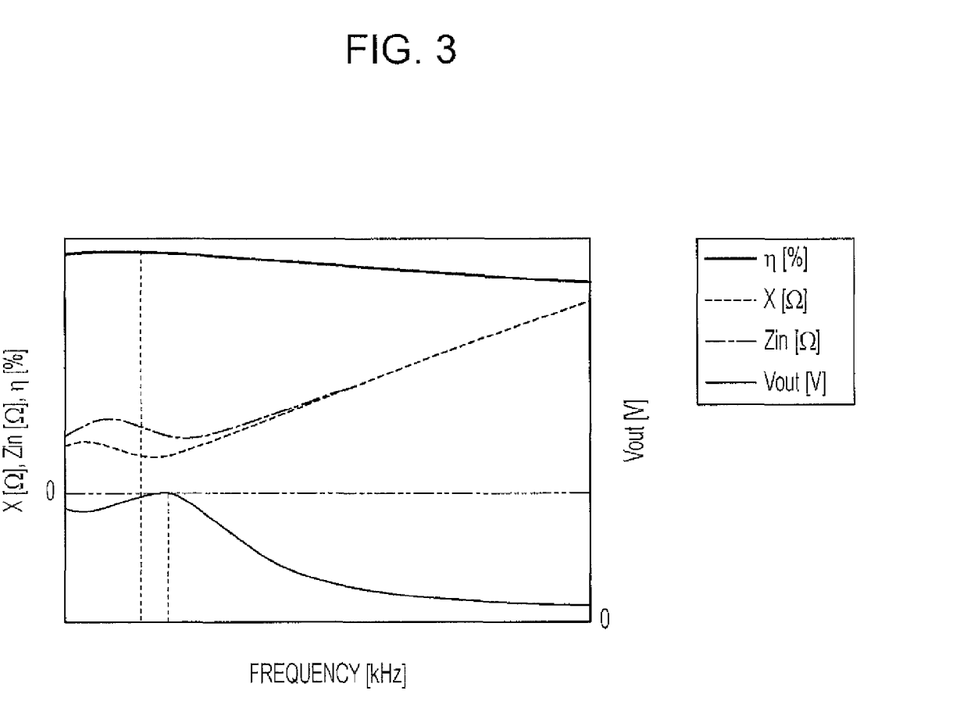
FIG. 3 is a graph illustrating various types of characteristics of the wireless power transmission system according to the first embodiment of the present invention, with respect to a driving frequency of a power conversion circuit.

Here, with reference to FIG. 3, a relationship between the driving frequency at which the transmission efficiency is highest and the driving frequency at which the output voltage value is largest will be described as an example. FIG. 3 is a graph illustrating various types of characteristics of the wireless power transmission system S1 according to the first embodiment of the present invention, with respect to the driving frequency of the power conversion circuit 120.

In the graph illustrated in FIG. 3, the horizontal axis represents the driving frequency f (kHz) of the power conversion circuit 120 and the vertical axis represents transmission efficiency η(%). The graph illustrated in FIG. 3 shows an output voltage value Vout (V) of the rectifier circuit 310, the impedance |Zin| (Zin=R+jX) (Ω) of a network that includes the power transmission coil L1, the power receiving coil L2, the resonant capacitor C1, and the load RL and that is seen from an output of the power conversion circuit 120, and reactance X (Ω), which is an imaginary part of the impedance of the network. Note that, R is a resistance component (a real part) of the network and the imaginary unit is represented by j. Here, in the example illustrated in FIG. 3, various types of characteristics of the wireless power transmission system S1 are illustrated in the case where a voltage peak value of an AC pulse wave output from the power conversion circuit 120 to the power transmission coil L1 is 390 (V) and a DC offset is 0 (V). As illustrated in FIG. 3, a driving frequency feffpeak at which the transmission efficiency η is highest is 90.000 (kHz) and a driving frequency fvpeak at which the output voltage value Vout is largest is 93.333 (kHz). In the wireless power transmission system S1 according to the first embodiment, the higher one of the driving frequency feffpeak at which the transmission efficiency η is highest and the driving frequency fvpeak at which the output voltage value Vout is largest is selected. That is, in the example illustrated in FIG. 3, 93.333 (kHz), which is the driving frequency fvpeak at which the output voltage value Vout is largest, is selected. At the driving frequency fvpeak at which the output voltage value Vout is largest, 93.333 (kHz), the reactance X satisfies the following Equation (1) and Equation (2), the reactance X being an imaginary part of the impedance of the network that includes the power transmission coil L1, the power receiving coil L2, the resonant capacitor C1, and the load RL and that is seen from the output of the power conversion circuit 120. Note that δf represents an amount of change in the driving frequency f and δX represents an amount of change in the reactance X with respect to the driving frequency f.

$$X > 0 \quad \text{Equation (1)}$$

$$\delta X/\delta f \gtrsim 0 \quad \text{Equation (2)}$$

In contrast, at the driving frequency feffpeak at which the transmission efficiency η is highest, 90.000 (kHz), Equation (1) is satisfied but Equation (2) is not satisfied as illustrated in FIG. 3.

Here, a relationship between Equations (1) and (2) and stable power feeding will be described in detail. First, in the case where Equation (1) is satisfied, the wireless power transmission system S1 according to the first embodiment performs power transmission in an inductive region. In contrast, in the case where Equation (1) is not satisfied, the wireless power transmission system S1 operates in a capacitive region or at a kind of area of neutrality including the inductive region and the capacitive region and is incapable of performing stable power transmission. On the other hand, in the case where Equation (2) is satisfied, the wireless power transmission system S1 is in a state in which positive power is supplied from the power supply side to the load side. In contrast, in the case where Equation (2) is not satisfied, power is supplied from the load side to the power supply side (power flows backward from the load side to the power supply side). In other words, power is reflected by the load side and it is incapable of performing stable power supply. That is, in the case where Equation (1) and Equation (2) are satisfied simultaneously, this refers to a condition on which the wireless power transmission system S1 is capable of performing stable power transmission.

As described above, when the higher one of the driving frequency feffpeak at which the transmission efficiency η is highest and the driving frequency (the driving frequency at which the output voltage value Vout generated in the power receiving device 300 is largest) fvpeak at which the output voltage value Vout is largest is selected, the reactance X satisfies Equation (1) and Equation (2), the reactance X being the imaginary part of the network that includes the power transmission coil L1, the power receiving coil L2, the resonant capacitor C1, and the load RL and that is seen from the output of the power conversion circuit 120. In other words, when the driving frequency f of the power conversion circuit 120 is set to a frequency at which the reactance X satisfies Equation (1) and Equation (2), similarly to as in the case where the higher one of the driving frequency feffpeak at which the transmission efficiency η is highest and the driving frequency (the driving frequency at which the output voltage value Vout generated in the power receiving device 300 is largest) fvpeak at which the output voltage value Vout is largest is selected, a change in the output voltage value may be suppressed with respect to a change in load. Thus, high power transmission efficiency may be maintained and stable power feeding may be realized.

Modified Example

Figure 4:
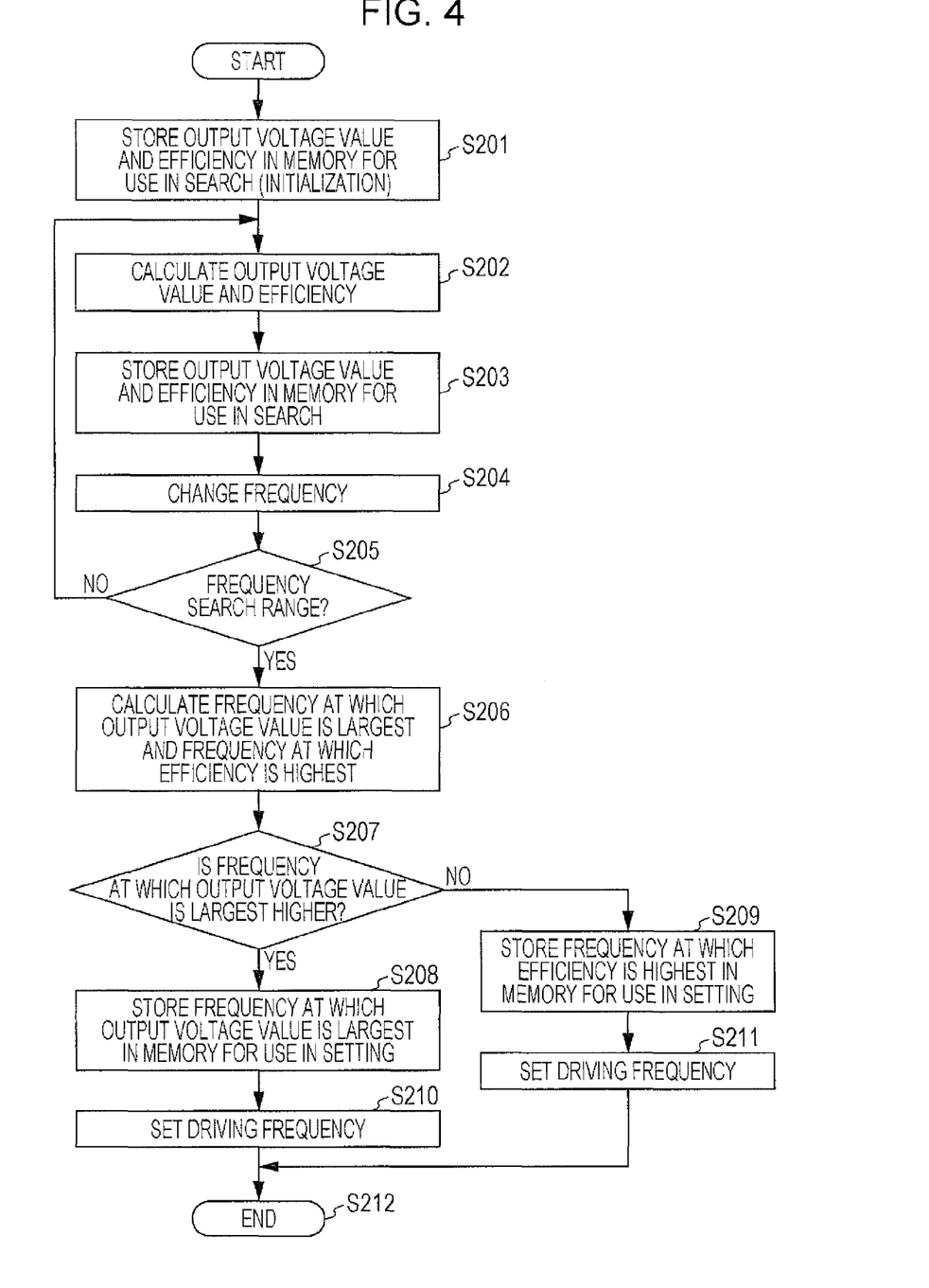
FIG. 4 is a flowchart illustrating a frequency search operation of a wireless power transmission system according to a second embodiment of the present invention.

Next, with reference to a flowchart of FIG. 4, a modified example of the frequency search operation of the wireless power transmission system S1 will be described in detail. FIG. 4 is a flowchart illustrating the frequency search operation of the wireless power transmission system S1 according to the modified example.

In the modified example illustrated in FIG. 4, the control circuit 140 sets the driving frequency of the power conversion circuit 120 to the upper-limit frequency or a lower-limit frequency of the frequency search range (setting of an initial frequency) and drives the power conversion circuit 120. The power source circuit 110 applies the initial voltage, which has been set low in advance (for example, about 50 V to 150 V), to the power transmission device 100 and the transmission device 100 is driven. Here, initialization is performed by storing an output voltage value, which is set to 0 V, and transmission efficiency, which is set to 0% in the memory for use in search, the memory being included in the control circuit 140 (step S201).

Next, the request signal SL10 for requesting an output voltage value of the rectifier circuit 310 and a receiving power value is sent from the power-transmission-side communication means 150 to the power-receiving-side communication means 340. When the power-receiving-side communication means 340 receives the request signal SL10 from the power-transmission-side communication means 150, the power-receiving-side detection circuit 320 detects an output voltage value and an output current value of the rectifier circuit 310 and outputs the voltage detection signal 322 and the current detection signal 324 based on the output voltage value and the output current value to the arithmetic circuit 330. The arithmetic circuit 330 calculates a receiving power value from the output voltage value and the output current value of the rectifier circuit 310 on the basis of the received voltage detection signal 322 and the received current detection signal 324. The detected output voltage value and the calculated receiving power value are converted by the power-receiving-side communication means 340 into the power-receiving-side state signal SL20, and the power-receiving-side state signal SL20 is sent to the power-transmission-side communication means 150. Here, the power-transmission-side detection circuit 130 detects an input voltage value and an input current value of the power conversion circuit 120 and outputs the voltage detection signal 132 and the current detection signal 134 based on the input voltage value and the input current value to the control circuit 140. The control circuit 140 calculates a transmission power value from the input voltage value and the input current value of the power conversion circuit 120 on the basis of the received voltage detection signal 132 and the received current detection signal 134. The control circuit 140 calculates a transmission efficiency by using the calculated transmission power value and the receiving power value obtained on the basis of the power-receiving-side state signal SL20 received by the power-transmission-side communication means 150 (step S202).

Next, the output voltage value and the transmission efficiency calculated in step S202 and the frequency at which the output voltage value calculated in step S202 is obtained, and the frequency at which the transmission efficiency calculated in step S202 is obtained are each stored in the memory for use in search included in the control circuit 140 (step S203).

Next, the control circuit 140 changes the driving frequency of the power conversion circuit 120 to a certain frequency in the frequency search range, and sets the driving frequency of the power conversion circuit 120 to the certain frequency (step S204). Here, in the case where the initial frequency is set to the upper-limit frequency of the frequency search range, the driving frequency of the power conversion circuit 120 is changed to a lower frequency. In the case where the initial frequency is set to the lower-limit frequency of the frequency search range, the driving frequency of the power conversion circuit 120 is changed to a higher frequency.

Next, it is determined whether or not the frequency set in step S204 exceeds the frequency search range (step S205). Here, in the case where the initial frequency is set to the upper-limit frequency of the frequency search range, it is determined whether or not the frequency set in step S204 is lower than the lower-limit frequency of the frequency search range. In the case where the initial frequency is set to the lower-limit frequency of the frequency search range, it is determined whether or not the frequency set in step S204 is higher than the upper-limit frequency of the frequency search range.

When it is determined that the frequency set in step S204 does not exceed the frequency search range (NO in step S205), the procedure returns to step S202 and processing from step S202 to step S205 is executed again. In contrast, when it is determined that the frequency set in step S204 exceeds the frequency search range (YES in step S205), the frequency at which the output voltage value is largest among the output voltage values calculated in step S202, that is, the frequency at which the voltage generated in the power receiving device 300 is highest, and the frequency at which the transmission efficiency is highest among the transmission efficiencies calculated in step S202 are calculated, the output voltage values and the transmission efficiencies being stored in the memory for use in search included in the control circuit 140 (step S206).

Next, the frequency that is calculated in step S206 and at which the output voltage value is largest is compared with the frequency that is calculated in step S206 and at which the transmission efficiency is highest (step S207).

As a result of comparison between the frequency that is calculated in step S206 and at which the output voltage value is largest and the frequency that is calculated in step S206 and at which the transmission efficiency is highest, when the frequency that is calculated in step S206 and at which the output voltage value is largest is higher (YES in step S207), the control circuit 140 stores the frequency that is calculated in step S206 and at which the output voltage value is largest, in the memory for use in setting included in the control circuit 140 (step S208). The control circuit 140 sets the driving frequency of the power conversion circuit 120 to the frequency that is stored in the memory for use in setting and at which the output voltage value is largest (step S210). In this manner, when the driving frequency of the power conversion circuit 120 is set to the frequency at which the output voltage value is largest, the frequency search operation ends (step S212).

As a result of comparison between the frequency that is calculated in step S206 and at which the output voltage value is largest and the frequency that is calculated in step S206 and at which the transmission efficiency is highest, when the frequency that is calculated in step S206 and at which the transmission efficiency is highest is higher (NO in step S207), the control circuit 140 stores the frequency that is calculated in step S206 and at which the transmission efficiency is highest, in the memory for use in setting included in the control circuit 140 (step S209). The control circuit 140 sets the driving frequency of the power conversion circuit 120 to the frequency that is stored in the memory for use in setting and at which the transmission efficiency is highest (step S211). In this manner, when the driving frequency of the power conversion circuit 120 is set to the frequency at which the transmission efficiency is highest, the frequency search operation ends (step S212).

As described above, according to this modified example, the control circuit 140 sets, in the predetermined frequency range, the frequency of the alternating voltage (the driving frequency of the power conversion circuit 120) to the higher one of the first frequency at which the transmission efficiency is highest and the second frequency at which the voltage generated in the power receiving device 300 is highest, and performs power transmission. Here, when the frequency of the alternating voltage output by the power conversion circuit 120 (the driving frequency of the power conversion circuit 120) is set to the first frequency at which the transmission efficiency is highest or the second frequency at which the voltage generated in the power receiving device 300 is highest, the power transmission efficiency may be improved. In the case where the higher one of these two frequencies is selected and the frequency of the alternating voltage (the driving frequency of the power conversion circuit 120) is set to the selected frequency, a change in the voltage generated in the power receiving device 300 may be suppressed with respect to a change in load. Thus, high power transmission efficiency may be maintained and stable power feeding may be realized.

Second Embodiment

Figure 5:
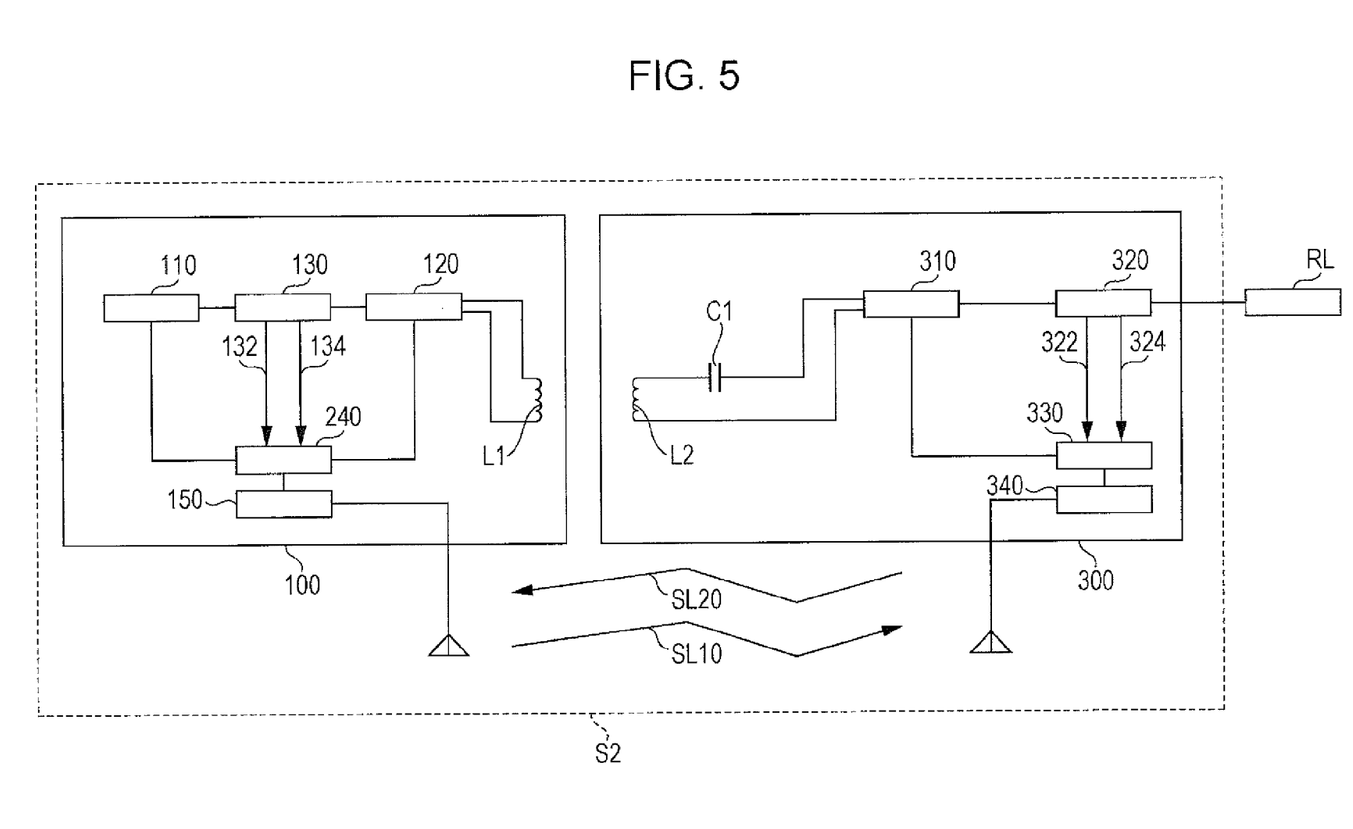
FIG. 5 is a structural diagram illustrating the wireless power transmission system according to the second embodiment of the present invention.

Next, with reference to FIG. 5, a wireless power transmission system S2 according to a second embodiment of the present invention will be described in detail. FIG. 5 is a structural diagram illustrating the wireless power transmission system S2 according to the second embodiment of the present invention and the load RL together. A control circuit of the wireless power transmission system S2 according to the second embodiment differs from that of the wireless power transmission system S1 according to the first embodiment in terms of operation. In the following, points that are different from the first embodiment will be mainly described.

The wireless power transmission system S2 includes, as illustrated in FIG. 5, the power transmission device 100 and the power receiving device 300. The power transmission device 100 includes the power source circuit 110, the power conversion circuit 120, the power-transmission-side detection circuit 130, a control circuit 240, the power-transmission-side communication means 150, and the power transmission coil L1. Here, the power conversion circuit 120 includes a switching circuit in which a plurality of switching elements are bridge connected.

The control circuit 240 calculates, similarly to as in the first embodiment, a transmission power value from the input voltage value and the input current value of the power conversion circuit 120 on the basis of the voltage detection signal 132 and the current detection signal 134 output from the power-transmission-side detection circuit 130. In addition, the control circuit 240 controls the driving frequency of the power conversion circuit 120 (the frequency of the alternating voltage output by the power conversion circuit 120) and performs a frequency search operation for selecting a driving frequency of the power conversion circuit 120 in a predetermined frequency range. Note that the second embodiment differs from the first embodiment in that the control circuit 240 performs control in such a manner that the duty ratio of a switching operation of the power conversion circuit 120 may be changed.

After the frequency search operation ends and the control circuit 240 sets the frequency of the alternating voltage (the driving frequency of the power conversion circuit 120) to the higher one of the frequency at which the output voltage value is largest (the frequency at which the voltage generated in the power receiving device 300 is highest) and the frequency at which the transmission efficiency is highest, the control circuit 240 performs control in such a manner that the duty ratio of the switching operation of the power conversion circuit 120 is changed from the duty ratio obtained before the frequency of the alternating voltage (the driving frequency of the power conversion circuit 120) is set. Specifically, in the case where power transmitted from the power transmission device 100 to the power receiving device 300 is below target power when the power conversion circuit 120 is driven with the duty ratio obtained before the frequency of the alternating voltage (the driving frequency of the power conversion circuit 120) is set, the control circuit 240 changes the duty ratio of the switching operation of the power conversion circuit 120 to a higher duty ratio. In this manner, when the duty ratio of the switching operation of the power conversion circuit 120 is increased, a time period during which a switching element (not shown) included in the power conversion circuit 120 is closed becomes longer. That is, when the switching element is closed for a longer time period, a time period for power transmission per switching operation also becomes longer. As a result, the amount of power transmitted from the power transmission device 100 to the power receiving device 300 increases. Note that, in the case where the duty ratio of the switching operation of the power conversion circuit 120 is increased and the power transmitted from the power transmission device 100 to the power receiving device 300 exceeds the target power, the control circuit 240 changes the duty ratio of the switching operation of the power conversion circuit 120 to a lower duty ratio.

In contrast, in the case where the power transmitted from the power transmission device 100 to the power receiving device 300 exceeds the target power when the power conversion circuit 120 is driven with the duty ratio obtained before the frequency of the alternating voltage (the driving frequency of the power conversion circuit 120) is set, the control circuit 240 changes the duty ratio of the switching operation of the power conversion circuit 120 to a lower duty ratio. In this manner, when the duty ratio of the switching operation of the power conversion circuit 120 is decreased, a time period during which the switching element (not shown) included in the power conversion circuit 120 is closed becomes shorter. That is, when the switching element is closed for a shorter time period, a time period for power transmission per switching operation also becomes shorter. As a result, the amount of power transmitted from the power transmission device 100 to the power receiving device 300 decreases. Note that, in the case where the duty ratio of the switching operation of the power conversion circuit 120 is decreased and the power transmitted from the power transmission device 100 to the power receiving device 300 is below the target power, the control circuit 240 changes the duty ratio of the switching operation of the power conversion circuit 120 to a higher duty ratio.

Here, in the case where the duty ratio of the switching operation of the power conversion circuit 120 may be changed, in a state in which power transmitted from the power transmission device 100 to the power receiving device 300 is maintained, a balance between the input voltage value and the input current value of the power conversion circuit 120 may be adjusted. That is, a malfunction such as overcurrent or overvoltage to the power conversion circuit 120 may be prevented and circuit parts may be prevented from being damaged.

As described above, in the wireless power transmission system S2 according to the second embodiment, the power conversion circuit 120 is a switching circuit. The control circuit 240 sets the frequency of the alternating voltage (the driving frequency of the power conversion circuit 120) to the higher one of the frequency at which the output voltage value is largest (the frequency at which the voltage generated in the power receiving device 300 is highest) and the frequency at which the transmission efficiency is highest, and thereafter changes the duty ratio of the switching operation of the power conversion circuit 120 from the duty ratio obtained before the frequency of the alternating voltage (the driving frequency of the power conversion circuit 120) is set. In this case, stable power feeding may be maintained and the balance between the input voltage value and the input current value of the power conversion circuit 120 may be adjusted. As a result, a malfunction such as overcurrent or overvoltage to the power conversion circuit 120 may be prevented and circuit parts may be prevented from being damaged.

Third Embodiment

Figure 6:
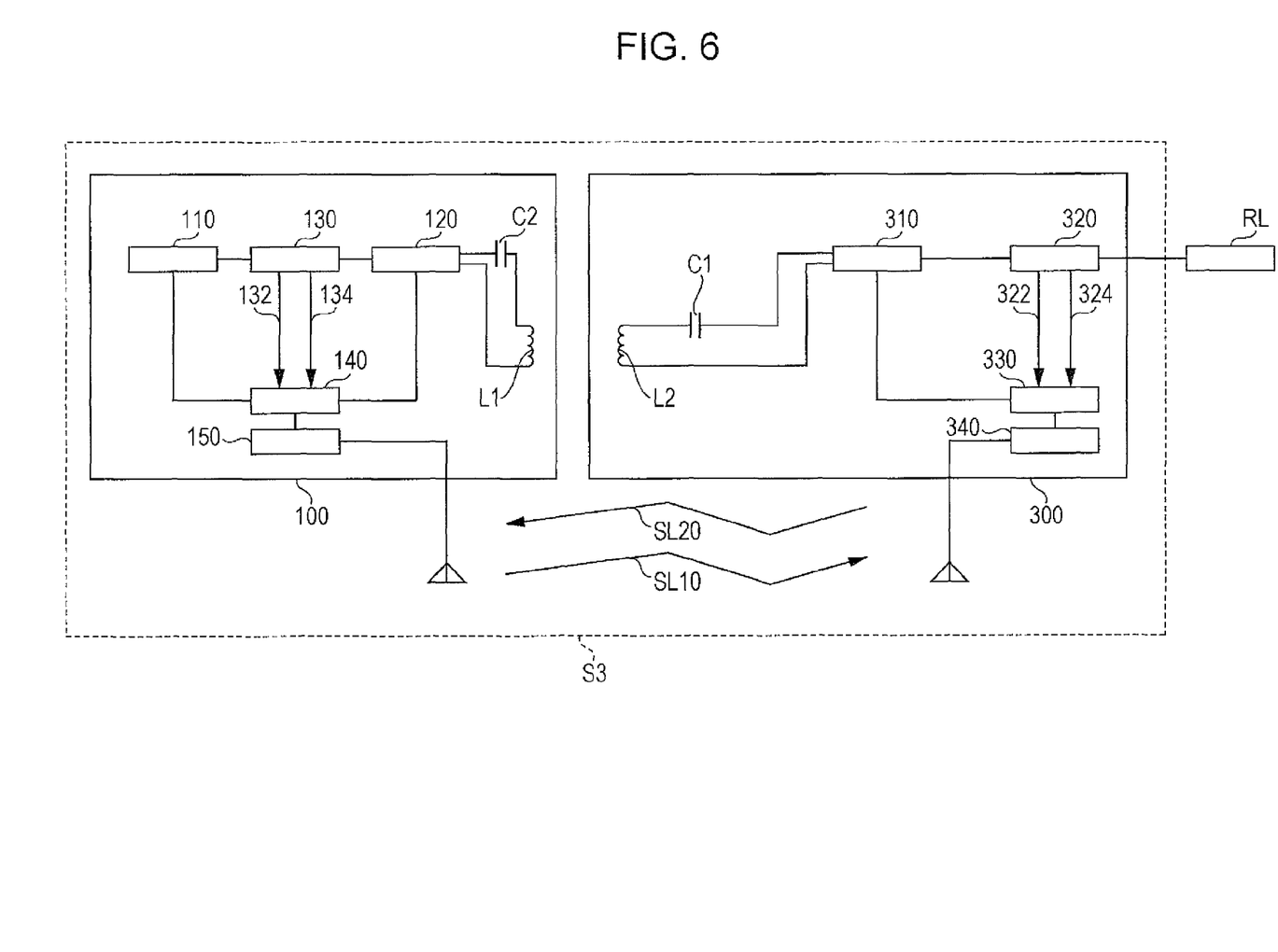
FIG. 6 is a structural diagram illustrating a wireless power transmission system according to a third embodiment of the present invention.

Next, with reference to FIG. 6, a wireless power transmission system S3 according to a third embodiment of the present invention will be described in detail. FIG. 6 is a structural diagram illustrating the wireless power transmission system S3 according to the third embodiment of the present invention and the load RL together. The wireless power transmission system S3 according to the third embodiment differs from the wireless power transmission system S1 according to the first embodiment in that the power transmission device 100 includes a resonant capacitor C2. In the following, points that are different from the first embodiment will be mainly described.

The wireless power transmission system S3 includes, as illustrated in FIG. 6, the power transmission device 100 and the power receiving device 300. The power transmission device 100 includes the power source circuit 110, the power conversion circuit 120, the power-transmission-side detection circuit 130, the control circuit 140, the power-transmission-side communication means 150, the power transmission coil L1, and the resonant capacitor C2. The power receiving device 300 includes the power receiving coil L2, the resonant capacitor C1, the rectifier circuit 310, the power-receiving-side detection circuit 320, the arithmetic circuit 330, and the power-receiving-side communication means 340. Note that the structure of the power source circuit 110, the power conversion circuit 120, the power-transmission-side detection circuit 130, the control circuit 140, the power-transmission-side communication means 150, the power transmission coil L1, the power receiving coil L2, the resonant capacitor C1, the rectifier circuit 310, the power-receiving-side detection circuit 320, the arithmetic circuit 330, and the power-receiving-side communication means 340 is similar to the structure of those of the wireless power transmission system S1 according to the first embodiment.

The resonant capacitor C2 and the power transmission coil L1 form an LC series resonant circuit. In the third embodiment, the resonant capacitor C2 is connected in series with the power transmission coil L1; however, the structure is not limited to this. For example, the resonant capacitor C2 may be connected in parallel with the power transmission coil L1.

In the wireless power transmission system S3 with such a structure, since a LC series resonant circuit is formed in both of the power transmission side and the power receiving side, there may be a case where the voltage generated in the power receiving device 300 has a plurality of maximum values and a case where the voltage generated in the power receiving device 300 has a single maximum value.

Figure 7:
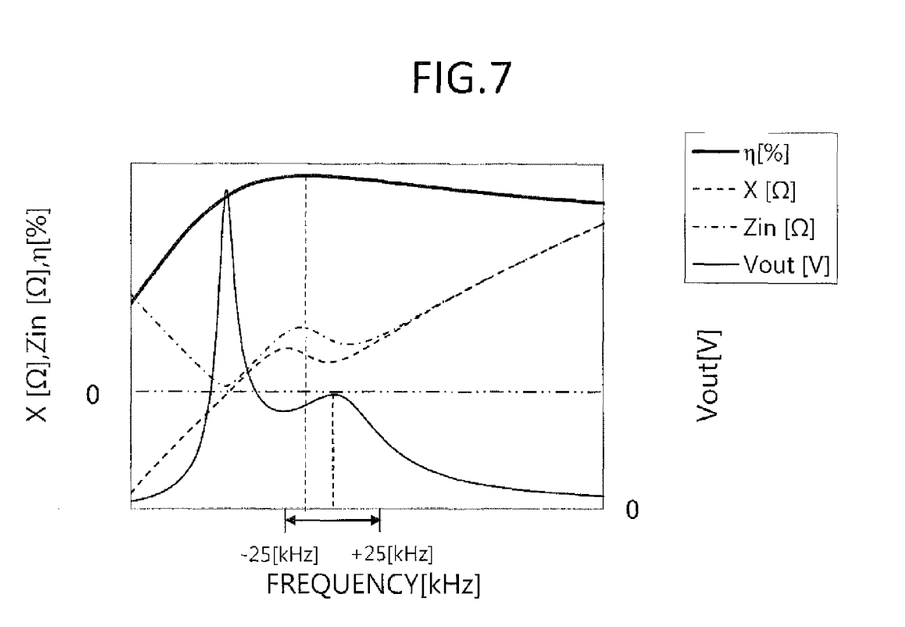
FIG. 7 is a graph illustrating various types of characteristics of the wireless power transmission system according to the third embodiment of the present invention, with respect to the driving frequency of the power conversion circuit.

First, with reference to FIG. 7, the case will be described in detail where the voltage generated in the power receiving device 300 has a plurality of maximum values. FIG. 7 is a graph illustrating various types of characteristics of a wireless power transmission system according to the third embodiment of the present invention, for the driving frequency of the power conversion circuit 120.

In the graph illustrated in FIG. 7, the horizontal axis represents the driving frequency f(kHz) of the power conversion circuit 120 and the vertical axis represents transmission efficiency η(%). The graph illustrated in FIG. 7 shows an output voltage value Vout (V) of the rectifier circuit 310, the impedance |Zin| (Zin=R+jX) (Ω) of a network that includes the power transmission coil L1, the power receiving coil L2, the resonant capacitor C1, the resonant capacitor C2, and the load RL and that is seen from an output of the power conversion circuit 120, and reactance X (Ω), which is an imaginary part of the impedance of the network. Note that, R is a resistance component (a real part) of the network and the imaginary unit is represented by j. Here, in an example illustrated in FIG. 7, various types of characteristics of the wireless power transmission system S3 are illustrated in the case where a voltage peak value of an AC pulse wave output from the power conversion circuit 120 to the power transmission coil L1 is 390 (V) and a DC offset is 0 (V). As illustrated in FIG. 7, the voltage generated in the power receiving device 300 has two maximum values.

In order that the frequency of the alternating voltage output by the power conversion circuit 120 controlled by the control circuit 140 is in an inductive region, the frequency of the alternating voltage is a frequency higher than the lower one of the frequencies of the two maximum values of the voltage generated in the power receiving device 300. In this example, a predetermined frequency range that the control circuit 140 searches may be a frequency range near (±25 (kHz)) the higher one of the frequencies of the two maximum values of the voltage generated in the power receiving device 300. Thus, when the control circuit 140 sets, in the predetermined frequency range, the initial frequency to the upper-limit frequency of the predetermined frequency range and performs the frequency search operation, the frequency at which the voltage generated in the power receiving device 300 is highest is the higher one of the frequencies of the two maximum values of the voltage generated in the power receiving device 300. In contrast, the frequency at which the transmission efficiency is highest is a frequency near the frequency of one of the maximum values of the voltage. As illustrated in FIG. 7, the higher one of the frequency at which the voltage generated in the power receiving device 300 is highest and the frequency at which the transmission efficiency is highest is the frequency at which the voltage generated in the power receiving device 300 is highest. The control circuit 140 sets the driving frequency of the power conversion circuit 120 (the frequency of the alternating voltage generated from the power conversion circuit 120) to the frequency at which the voltage generated in the power receiving device 300 is highest, and performs power transmission. Here, the frequency at which the voltage generated in the power receiving device 300 is highest satisfies the above-described Equation (1) and Equation (2) simultaneously. Thus, a change in the voltage generated in the power receiving device 300 may be suppressed with respect to a change in the load RL. Thus, high power transmission efficiency may be maintained and stable power feeding may be realized. Note that, since the frequency search operation of the control circuit 140 is similar to that of the wireless power transmission system S1 according to the first embodiment, description of the frequency search operation will be omitted in the third embodiment.

Figure 8:
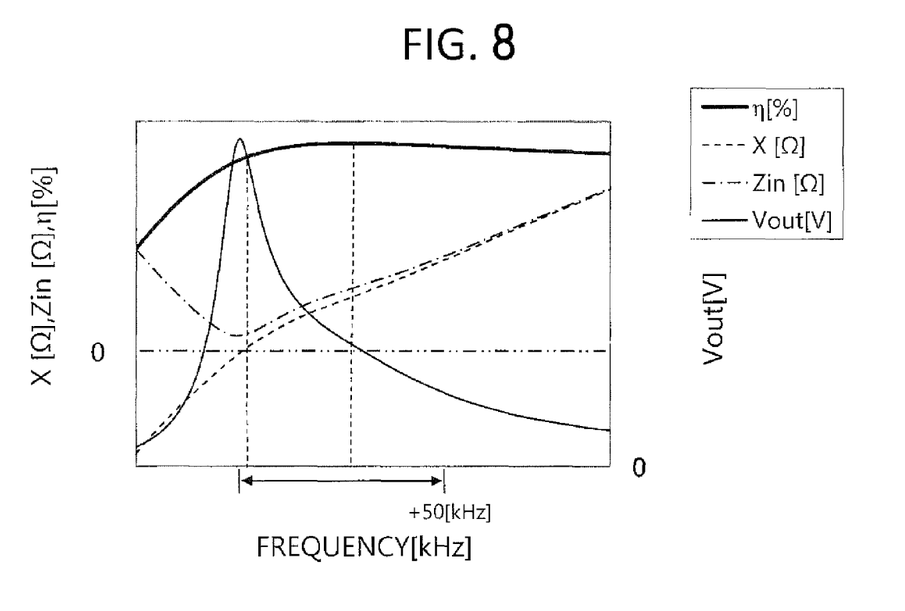
FIG. 8 is a graph illustrating various types of characteristics of the wireless power transmission system according to the third embodiment of the present invention, in the case where a change in load has occurred with respect to the driving frequency of the power conversion circuit.

Next, with reference to FIG. 8, in the wireless power transmission system S3, the case where the voltage generated in the power receiving device 300 has a single maximum value will be described in detail. FIG. 8 is a graph illustrating various types of characteristics of the wireless power transmission system S3 according to the third embodiment of the present invention, in the case where a change in load has occurred with respect to the driving frequency of a power conversion circuit.

In the graph illustrated in FIG. 8, the horizontal axis represents the driving frequency f(kHz) of the power conversion circuit 120 and the vertical axis represents transmission efficiency η(%). The graph illustrated in FIG. 8 shows an output voltage value Vout (V) of the rectifier circuit 310, the impedance |Zin| (Zin=R+jX) (Ω) of a network that includes the power transmission coil L1, the power receiving coil L2, the resonant capacitor C1, the resonant capacitor C2, and the load RL and that is seen from an output of the power conversion circuit 120, and reactance X (Ω), which is an imaginary part of the impedance of the network. Note that, R is a resistance component (a real part) of the network and the imaginary unit is represented by j. Here, in an example illustrated in FIG. 8, various types of characteristics of the wireless power transmission system S3 are illustrated in the case where a voltage peak value of an AC pulse wave output from the power conversion circuit 120 to the power transmission coil L1 is 390 (V) and a DC offset is 0 (V) and the load RL has a higher resistance than that in the example illustrated in FIG. 7. As illustrated in FIG. 8, the voltage generated in the power receiving device 300 has a single maximum value.

In order that the frequency of the alternating voltage output by the power conversion circuit 120 controlled by the control circuit 140 is in an inductive region, the frequency of the alternating voltage is a frequency higher than the frequency of the maximum value of the voltage generated in the power receiving device 300. In this example, a predetermined frequency range that the control circuit 140 searches may be a frequency range of +50 (kHz) from the frequency of the maximum value of the voltage generated in the power receiving device 300. Thus, the frequency at which the voltage generated in the power receiving device 300 is highest is a frequency near the lower limit of the predetermined frequency range. In contrast, the frequency at which the transmission efficiency is highest is a frequency near the frequency that is +25 (kHz) higher than the frequency of the maximum value of the voltage generated in the power receiving device 300. As illustrated in FIG. 8, the higher one of the frequency at which the voltage generated in the power receiving device 300 is highest and the frequency at which the transmission efficiency is highest is the frequency at which the transmission efficiency is highest. The control circuit 140 sets the driving frequency of the power conversion circuit 120 (the frequency of the alternating voltage generated from the power conversion circuit 120) to the frequency at which the transmission efficiency is highest, and performs power transmission. Here, the frequency at which the transmission efficiency is highest satisfies the above-described Equation (1) and Equation (2) simultaneously. Thus, a change in the voltage generated in the power receiving device 300 may be suppressed with respect to a change in the load RL. Thus, high power transmission efficiency may be maintained and stable power feeding may be realized. Note that, since the frequency search operation of the control circuit 140 is similar to that of the wireless power transmission system S1 according to the first embodiment, description of the frequency search operation will be omitted in the third embodiment.

As described above, in the wireless power transmission system S3 according to the third embodiment, in either of the case where the voltage generated in the power receiving device 300 has a plurality of maximum values and the case where the voltage generated in the power receiving device 300 has a single maximum value, the control circuit 140 sets, in the predetermined frequency range, the driving frequency of the power conversion circuit 120 (the frequency of the alternating voltage output by the power conversion circuit 120) to the higher one of the frequency at which the voltage generated in the power receiving device 300 is highest and the frequency at which the transmission efficiency is highest. Thus, a change in the voltage generated in the power receiving device 300 may be suppressed with respect to a change in the load RL. Thus, high power transmission efficiency may be maintained and stable power feeding may be realized.

Preferred embodiments of the present invention have been described; however, the present invention is not limited to the above-described embodiments and various modifications are permissible without departing from the scope of the present invention. In addition, the described elements include elements that those skilled in the art may easily conceive and elements that are substantially the same as the described elements. Furthermore, the described elements may be combined as necessary.

What is claimed is:

1. A power transmission device that wirelessly transmits alternating current power to a power receiving device, the power transmission device comprising:
   a power conversion circuit that outputs an alternating voltage in order to generate an alternating magnetic field; and
   a control circuit used to control a frequency of the alternating voltage, wherein
   the control circuit sets, in a predetermined frequency range, the frequency of the alternating voltage to a higher one of a first frequency at which transmission efficiency is highest and a second frequency at which a voltage generated in the power receiving device is highest, and performs power transmission.

2. The power transmission device according to claim 1, further comprising:
   a power source circuit that supplies direct current power to the power conversion circuit,
   wherein the control circuit sets the frequency of the alternating voltage and thereafter causes a supply voltage, which is to be supplied to the power conversion circuit, to be higher than a supply voltage obtained before the frequency of the alternating voltage is set.

3. The power transmission device according to claim 1, wherein
   the power conversion circuit is a switching circuit, and
   the control circuit sets the frequency of the alternating voltage and thereafter changes a duty ratio of a switching operation of the power conversion circuit, the duty ratio being obtained before the frequency of the alternating voltage is set.

4. A wireless power transmission system comprising:
   the power transmission device according to claim 1; and
   a power receiving device.

5. A wireless power transmission system comprising:
   the power transmission device according to claim 2; and
   a power receiving device.

6. A wireless power transmission system comprising:
   the power transmission device according to claim 3; and
   a power receiving device.

* * * * *